(12) United States Patent
Adachi

(10) Patent No.: US 10,752,097 B2
(45) Date of Patent: Aug. 25, 2020

(54) VEHICULAR-USE DOOR AND METHOD OF PRODUCTION OF VEHICULAR-USE DOOR

(71) Applicant: TOYOTA JIDOSHA KABUSHIKI KAISHA, Toyota-shi, Aichi-ken (JP)

(72) Inventor: Yoshiyuki Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/132,704

(22) Filed: Sep. 17, 2018

(65) Prior Publication Data

US 2019/0135093 A1  May 9, 2019

(30) Foreign Application Priority Data

Nov. 7, 2017 (JP) .................. 2017-214620

(51) Int. Cl.
| | | |
|---|---|---|
| *B60J 5/10* | (2006.01) | |
| *B29C 65/00* | (2006.01) | |
| *B29C 65/82* | (2006.01) | |
| *F16B 11/00* | (2006.01) | |
| *B60J 5/04* | (2006.01) | |
| *B29C 65/78* | (2006.01) | |
| *B29L 31/00* | (2006.01) | |
| *B29C 65/48* | (2006.01) | |
| *B29L 31/30* | (2006.01) | |

(52) U.S. Cl.
CPC .............. *B60J 5/107* (2013.01); *B60J 5/101*
(2013.01); *B29C 65/48* (2013.01); *B29C 65/7829* (2013.01); *B29C 65/8246* (2013.01); *B29C 66/112* (2013.01); *B29C 66/131* (2013.01); *B29C 66/543* (2013.01); *B29L 2031/30* (2013.01); *B29L 2031/724* (2013.01); *B60J 5/0481* (2013.01); *F16B 11/006* (2013.01)

(58) Field of Classification Search
CPC .......... B60J 5/107; B60J 5/101; B60J 5/0481; B29C 65/48; B29C 65/7829; B29C 65/8246; B29C 66/112; B29C 66/131; B29C 66/546; B29L 2031/30; B29L 2031/724; F16B 11/006
See application file for complete search history.

(56) References Cited

U.S. PATENT DOCUMENTS 5,273,606 A * 12/1993 Greve .................. B62D 27/026
156/216

FOREIGN PATENT DOCUMENTS

| JP | 2016-078566 A | 5/2016 |
| JP | 2016-084106 A | 5/2016 |

* cited by examiner

*Primary Examiner* — Lori L Lyjak
(74) *Attorney, Agent, or Firm* — Oliff PLC

(57) ABSTRACT

A vehicular-use door comprising a first panel and a second panel bonded to a panel bonding part of the first panel, wherein the first panel is provided with a plurality of ribs, sticking out from the panel bonding part so as to cross the adhesive coated on the first panel or the second panel, along the coating direction of the adhesive, and each rib is provided with a non-visible part which is bonded to the second panel and which is covered by the second panel and can no longer be viewed from the outside and a visible part which extends from the non-visible part in a direction crossing the adhesive and which is not covered by the second panel and can be viewed from the outside.

3 Claims, 9 Drawing Sheets

VEHICULAR-USE DOOR AND METHOD OF PRODUCTION OF VEHICULAR-USE DOOR

CROSS-REFERENCE TO RELATED APPLICATION

This application claims priority based on Japanese Patent Application No. 2017-214620 filed with the Japan Patent Office on Nov. 7, 2017, the entire contents of which are incorporated into the present specification by reference.

FIELD

The present disclosure relates to a vehicular-use door and a method of production of a vehicular-use door.

BACKGROUND

Japanese Unexamined Patent Publication No. 2016-078566A discloses as a conventional vehicular-use door a door comprised of a plastic inner panel and outer panel bonded by an adhesive.

SUMMARY

If performing the coating work of coating an inner panel with an adhesive and the bonding work of bonding an outer panel to the inner panel after coating the adhesive by a robot etc. automatically, sometimes the outer panel will be bonded to the inner panel despite there being a location where the adhesive is partially not coated. An adhesive performs the role of a seal for sealing a clearance formed between the inner panel and the outer panel after curing, so if there is a location where the adhesive partially is not coated, water is liable to leak from that location to the inside of the vehicle compartment.

Any occurrence of water leakage can be confirmed by a water leakage test. Further, if water leakage occurs, the location of water leakage (location where adhesive partially is not coated) is identified and the water leakage is repaired by manual work of a repair worker.

However, in the state after the outer panel is bonded to the inner panel, the repair worker cannot view the location of water leakage formed in the clearance between panels from the outside, so it is difficult to judge from where to where to make the repair so that water leakage will be eliminated and therefore there was the problem that the range of repair easily became unclear.

The present disclosure was made focusing on such a problem and has as its object to clarify the range of repair in the case where a water leakage occurs.

To solve this technical problem, the vehicular-use door according to one aspect of the present disclosure is provided with a first panel and a second panel bonded to a panel bonding part of the first panel. Further, the first panel is configured so as to be provided with a plurality of ribs, sticking out from the panel bonding part so as to cross the adhesive coated on the first panel or the second panel, along the coating direction of the adhesive. Each rib is provided with a non-visible part which is bonded to the second panel and which is covered by the second panel and can no longer be viewed from the outside and a visible part which extends from the non-visible part in a direction crossing the adhesive and which is not covered by the second panel and can be viewed from the outside.

Further, the method of production of a vehicular-use door according to another aspect of the present disclosure comprises a coating step of coating a panel bonding part of a first panel with an adhesive so as to cross a plurality of ribs formed at the panel bonding part or coating an adhesive on a facing surface of a second panel facing the panel bonding part of the first panel on which the plurality of ribs are formed, a bonding step of bonding the second panel to the panel bonding part so that parts of the ribs not crossing the adhesive after the coating step can be viewed from the outside when coating the panel bonding part with the adhesive in the coating step and of bonding the second panel to the panel bonding part so that the adhesive crosses the ribs and so that parts of the ribs not crossing the adhesive can be viewed from the outside after the coating step when coating the facing surface of the second panel with the adhesive in the coating step, an inspection step of inspecting for any water leakage from a clearance between the first panel and the second panel divided into a plurality of regions along the coating direction of the adhesive by the ribs after the bonding step, and a repair step of repairing a region where water leakage is confirmed in the plurality of regions divided by the ribs when water leakage is confirmed by the inspection step.

According to the vehicular-use door and the method of production of a vehicular-use door according to these aspects of the present disclosure, it is possible to clarify the range of repair in the case where water leakage has occurred.

DESCRIPTION OF EMBODIMENTS

Figure 1:
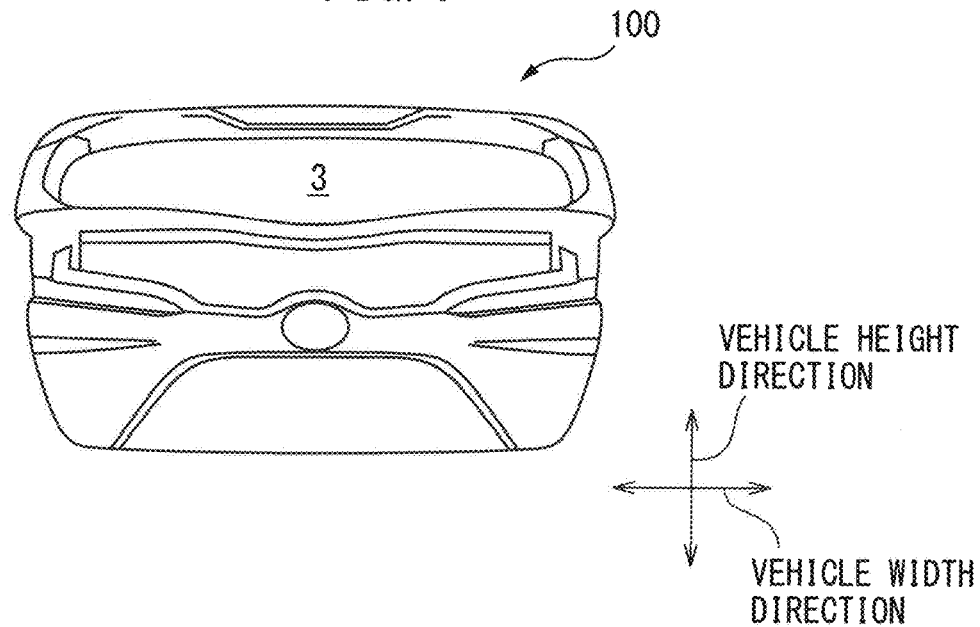
FIG. 1 is a front view of a vehicular-use door according to one embodiment of the present disclosure.

Below, referring to the drawings, an embodiment of the present disclosure will be explained in detail. Note that in the following explanation, similar components are assigned the same reference notations.

FIG. 1 is a front view of a vehicular-use door 100 according to one embodiment of the present disclosure.

A vehicular-use door 100 according to the present embodiment is a liftgate type back door attached to the body of a vehicle at its rear side and opening and closing up and down in the vehicle height direction about the vehicle width direction as the axial direction.

Figure 2:
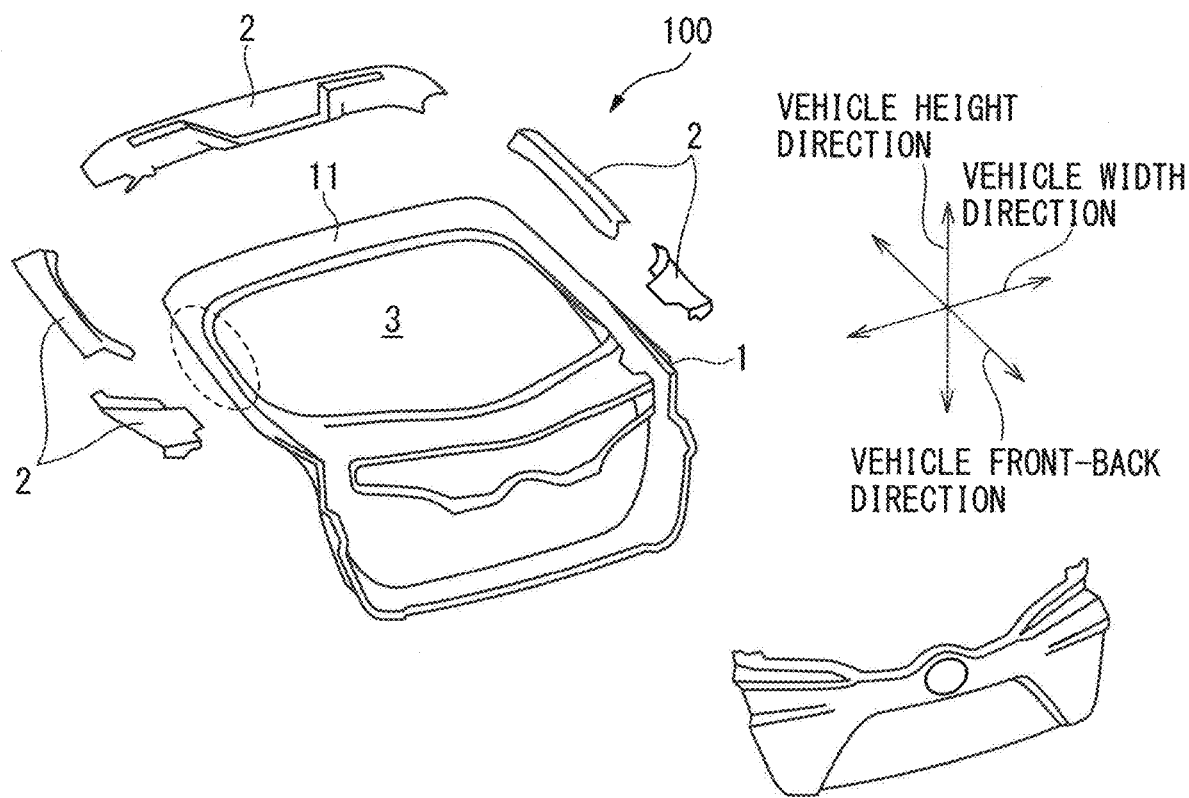
FIG. 2 is a disassembled perspective view of a vehicular-use door.

FIG. 2 is a disassembled perspective view of a vehicular-use door 100.

As shown in FIG. 2, the vehicular-use door 100 is provided with an inner panel 1 and outer panels 2. Note that FIG. 2 illustrates five outer panels 2. In explaining the main parts of the disclosure, these do not have to be particularly differentiated, so below for convenience in explanation, the outer panels 2 will not be particularly differentiated in the explanation.

The inner panel 1 is a plastic panel positioned at the inside of a vehicle compartment when the vehicular-use door 100 is attached to the vehicle. The inner panel 1 is formed with a rectangular shaped window-use opening 3 at a part at the top part of the panel extending in the vehicle front-back direction when the vehicular-use door 100 is attached to the vehicle.

The outer panels 2 are plastic panels positioned at the outside of the vehicle compartment when the vehicular-use door 100 is attached to the vehicle. The outer panels 2 are bonded by an adhesive to a peripheral edge part 11 of the window-use opening 3 formed in the inner panel 1. After the outer panels 2 are bonded to the inner panel 1, a rear window glass (not shown) for covering the window-use opening 3 is bonded by an adhesive to the outer panels 2.

Below, referring to FIG. 11 to FIG. 14, an explanation will be given for the problems which can arise when the coating work for coating the inner panel 1 with an adhesive and the bonding work for bonding the outer panels 2 to the inner panel 1 after coating the adhesive are performed by a robot etc. automatically.

Figure 11:
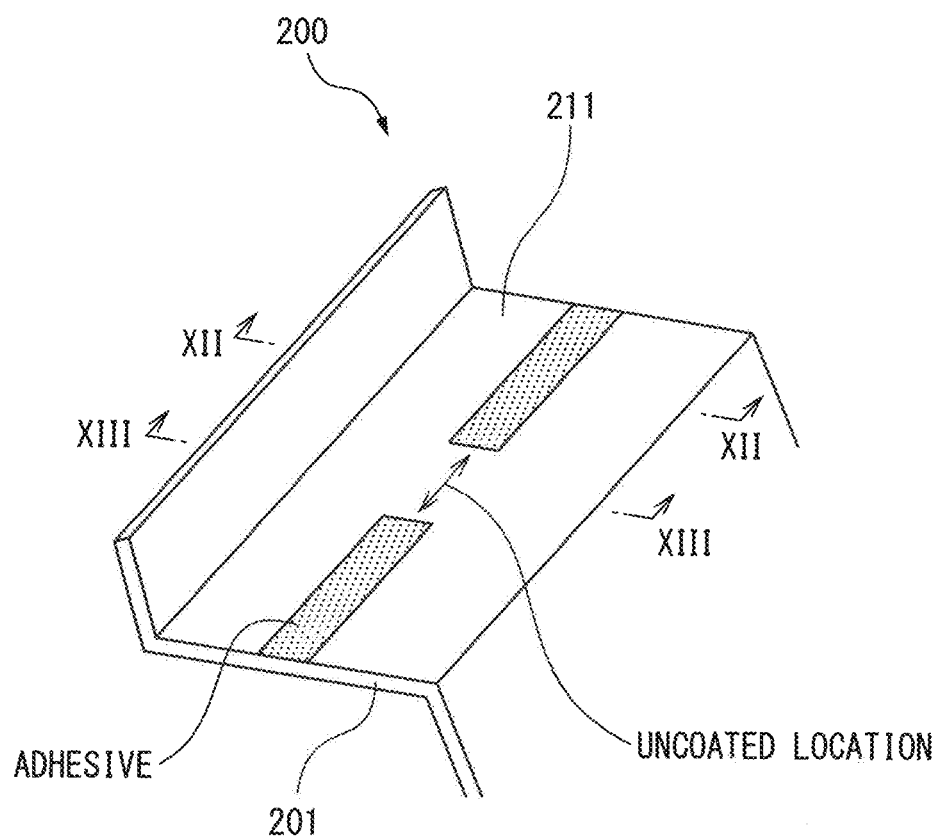
FIG. 11 is a view showing simplified a peripheral edge part of an inner panel of a vehicular-use door according to a comparative example different from the embodiment of the present disclosure.
Figure 12:
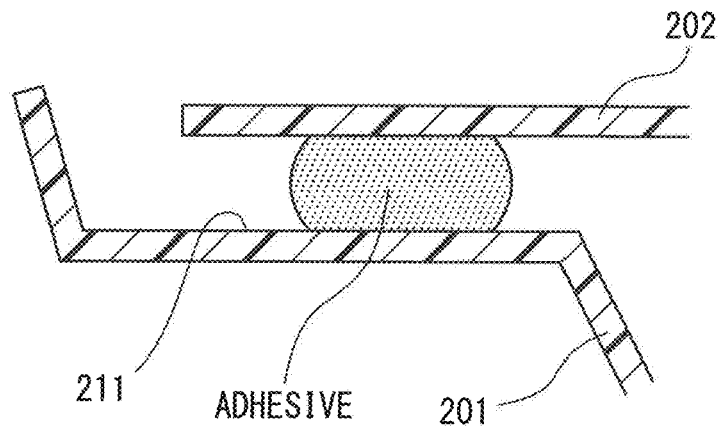
FIG. 12 is a cross-sectional view of a vehicular-use door according to a comparative example along line XII-XII of FIG. 11 in the state when bonding the outer panel.
Figure 13:
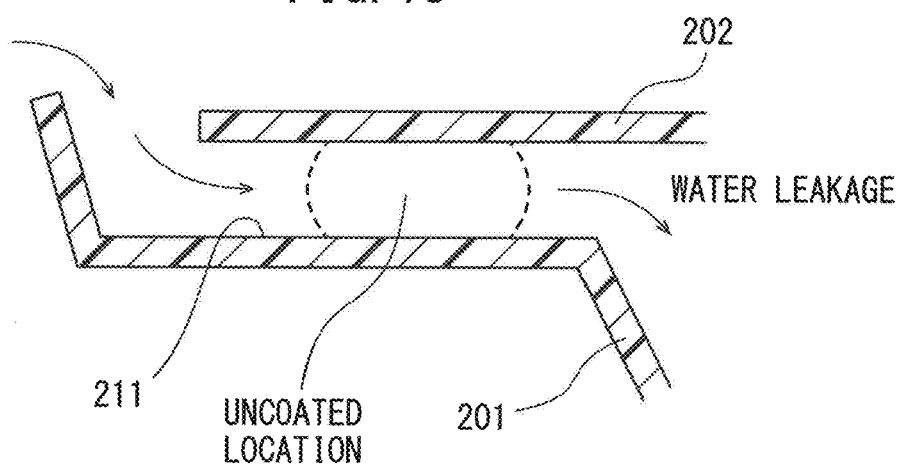
FIG. 13 is a cross-sectional view of a vehicular-use door according to a comparative example along line XIII-XIII of FIG. 11 in the state when bonding the outer panel.

FIG. 11 is a view showing simplified a peripheral edge part 211 of an inner panel 201 of a vehicular-use door 200 according to a comparative example different from the present embodiment and shows the part corresponding to the part surrounded by the broken line in FIG. 2. FIG. 12 is a cross-sectional view of the vehicular-use door 200 according to the comparative example along the line XII-XII of FIG. 11 in the state when bonding an outer panel 202. FIG. 13 is a cross-sectional view of the vehicular-use door 200 according to the comparative example along line XIII-XIII of FIG. 11 in the state when bonding the outer panel 202.

If bonding the outer panel 202 to the peripheral edge part 211 of the inner panel 201, for example, as shown in FIG. 11, the peripheral edge part 211 of the inner panel 201 is coated with the adhesive along the peripheral direction of the peripheral edge part 211 or the facing surface of the outer panel 202 facing the peripheral edge part 11 is coated with the adhesive. The adhesive is coated for example by discharging from a nozzle the adhesive pumped in through piping.

At this time, if for example air flows into the piping and the air pools there, temporarily, adhesive will not be discharged from the nozzle and only air will sometimes end up being discharged. As a result, as shown in FIG. 11, sometimes partially a location will arise where the adhesive ends up not being coated (below, referred to as an "uncoated location"), but if performing the coating work and bonding work by a robot etc. automatically, the outer panel 202 will sometimes be bonded to the inner panel 201 despite there being an uncoated location.

As shown in FIG. 12, the adhesive performs the role as a seal for sealing the clearance formed between the inner panel 201 and the outer panel 202 after curing (below, referred to as the "clearance between panels") and preventing water from entering from the clearance between panels to the vehicle compartment. For this reason, if an uncoated location ends up being formed, as shown in FIG. 13, it ends up becoming no longer possible to seal the clearance between panels by the adhesive, the seal becomes insufficient, and water leakage to the inside of the vehicle compartment is liable to occur.

Any occurrence of water leakage can be confirmed by a water leakage test. Further, if water leakage has occurred, the practice is to identify the water leakage location, that is, the uncoated location, and repair the water leakage by manual work of a repair worker.

Figure 14:
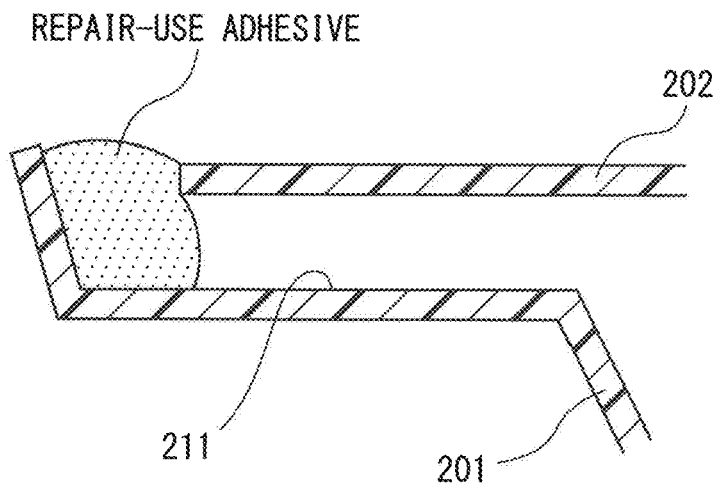
FIG. 14 is a view for explaining a repair method in the case where water leakage has occurred in a vehicular-use door according to a comparative example different from an embodiment of the present disclosure.

Here, in the state after bonding the outer panel 202 to the inner panel 201, it is difficult to recoat a repair-use adhesive to repair water leakage in a pinpoint manner at the uncoated location formed inside the clearance between panels. For this reason, for example, as shown in FIG. 14, the water leakage is repaired by recoating a repair-use adhesive at the entrance to the clearance between panels along the peripheral direction.

However, in the state after bonding the outer panel 202 to the inner panel 201, the repair worker cannot directly view the uncoated location from the outside, so from where to where along the peripheral direction at the entrance to the clearance between panels to make the repair (recoat the repair-use adhesive) so that water leakage no longer occurs is difficult to judge and the range of repair easily becomes unclear.

Therefore, in the present embodiment, the clearance between panels is divided into a plurality of regions so that the range of repair when water leakage occurs becomes clear. Below, details of the vehicular-use door 100 according to the present embodiment will be explained.

Figure 3:
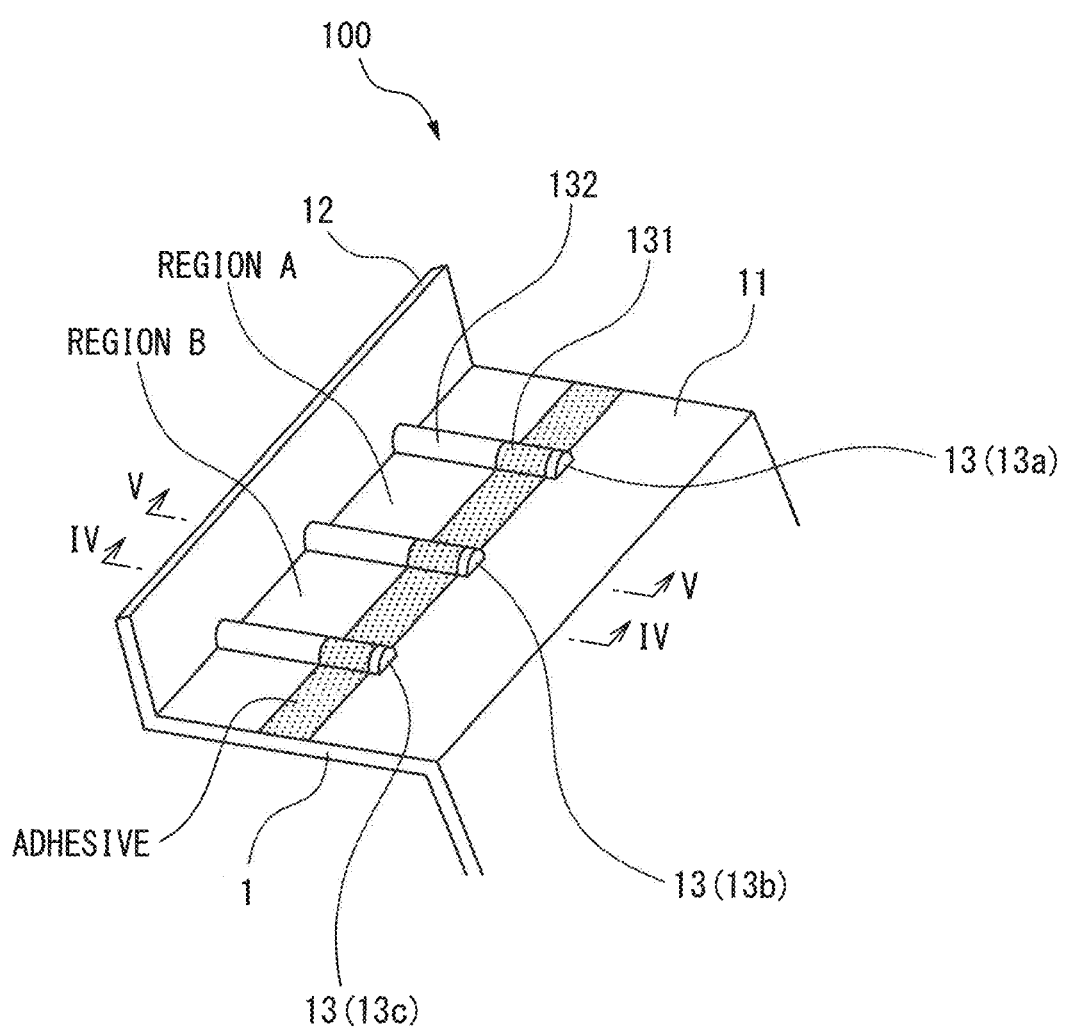
FIG. 3 is a view showing simplified a peripheral edge part of an inner panel of a vehicular-use door according to the present embodiment and showing the part surrounded by broken lines in FIG. 2.

FIG. 3 is a view showing simplified the peripheral edge part 11 of the inner panel 1 of the vehicular-use door 100 according to the present embodiment and partially shows the part surrounded by broken lines in FIG. 2.

As shown in FIG. 3, the peripheral edge part 11 of the inner panel 1 of the vehicular-use door 100 according to the present embodiment is formed with a flange 12 and ribs 13.

The flange 12 is a wall-shaped portion sticking out from the surface of the peripheral edge part 11 so as to extend substantially in parallel to the coating direction of the adhesive along the outer edge of the peripheral edge part 11.

The ribs 13 are portions which stick out in line shapes from the surface of the peripheral edge part 11 so that parts (non-visible parts 131 explained later) cross the adhesive coated on the surface of the peripheral edge part 11, or the facing surface of the outer panel 2 facing the peripheral edge part 11. A plurality are formed at constant intervals in the coating direction. In the present embodiment, the ribs 13 are formed so as to extend in line shapes in a direction perpendicular to the coating direction of the adhesive. Further, the ribs 13 extend up to the outer edge side of the peripheral edge part 11 so that a repair worker can view the parts not crossing the adhesive (visible parts 132 explained later) from the outside even after bonding the outer panel 2 and are formed so that in the present embodiment, the end parts at the outer edge side abut against the flange 12.

Figure 4:
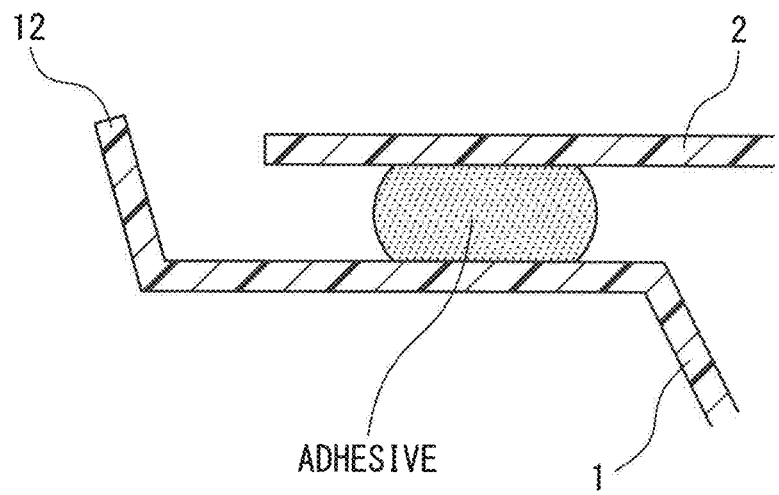
FIG. 4 is a cross-sectional view of a vehicular-use door according to the present embodiment along the line IV-IV of FIG. 3 in the state with the outer panel bonded.
Figure 5:
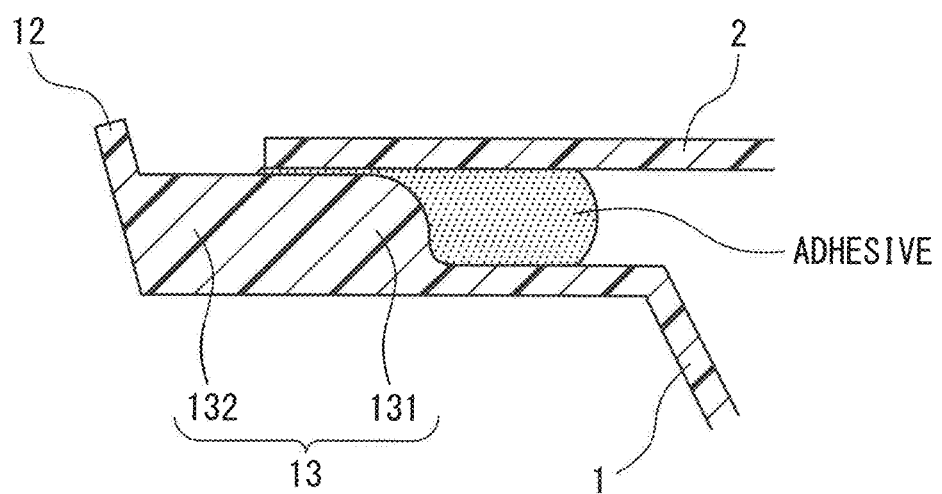
FIG. 5 is a cross-sectional view of a vehicular-use door according to the present embodiment along the line V-V of FIG. 3 in the state with the outer panel bonded.

FIG. 4 is a cross-sectional view of the vehicular-use door 100 according to the present embodiment along the line IV-IV of FIG. 3 in the state with an outer panel 2 bonded. FIG. 5 is a cross-sectional view of the vehicular-use door 100 according to the present embodiment along the line V-V of FIG. 3 in the state with the outer panel 2 bonded.

As shown in FIG. 5, the outer panel 2 is bonded to the inner panel 1 so that the part of a rib 13 not crossing the adhesive (portion extending up to outer edge side of peripheral edge part 11, that is, later explained visible part 132) can be viewed by a repair worker from the outside even after bonding the outer panel 2.

Further, as shown in FIG. 4, at a part where no rib 13 is formed, the clearance between the peripheral edge part 11 of the inner panel 1 and the outer panel 2 is sealed by an adhesive. Further, as shown in FIG. 5, at a part where a rib 13 is formed, the clearance between the rib 13 and the outer panel 2 is sealed by an adhesive.

In this way, the ribs 13 of the present embodiment, as shown from FIG. 3 to FIG. 5, are provided with non-visible parts 131 which are bonded to the outer panel 2 and covered by the outer panel 2 to no longer be visible from the outside and visible parts 132 which extend from the non-visible parts 131 in a direction crossing the adhesive (in the present embodiment, the direction perpendicular to the coating direction of the adhesive) and are not covered by the outer panel 2 so can be viewed from the outside. Note that, in the present embodiment, in this way, the visible parts 132 of the ribs 13 are formed so as to extend continuously from the non-visible parts 131 in a direction crossing the adhesive, but may also be formed to extend discontinuously.

By providing such ribs 13 at the peripheral edge part 11 of the inner panel 1, it is possible to divide the clearance between panels arising after bonding the outer panel 2 into a plurality of regions along the coating direction of the adhesive and possible to clarify the range of repair of water leakage and easily perform repair of water leakage.

For example, if referring to the three ribs 13 illustrated in FIG. 3 as the first rib 13a, second rib 13b, and third rib 13c for convenience in explanation, the clearance between panels formed after bonding the outer panel 2 can be divided into the region A formed sectioned off at the outer edge side of the peripheral edge part 11 by the first rib 13a and the second rib 13b and the adhesive and the region B formed sectioned off at the outer edge side of the peripheral edge part 11 by the second rib 13b and the third rib 13c and the adhesive.

Figure 6:
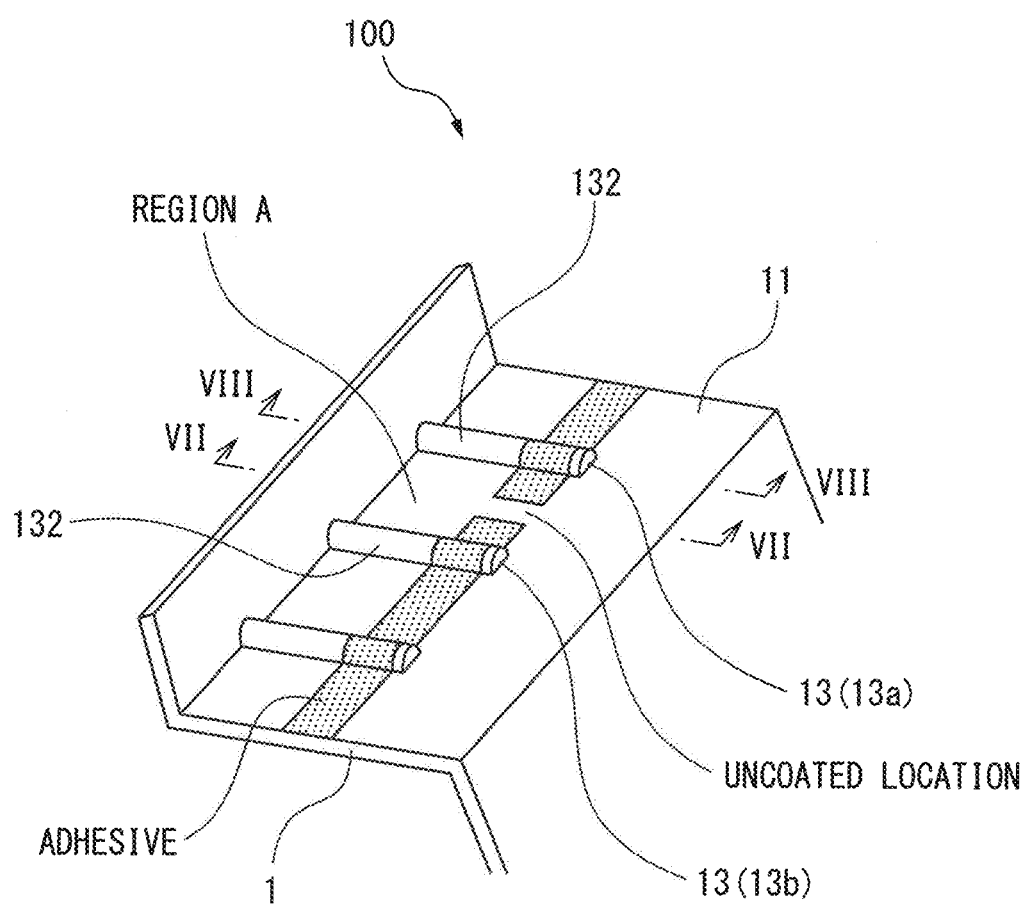
FIG. 6 a view showing one example of the case where an uncoated location occurs when coating a peripheral edge part of an inner panel of a vehicular-use door according to the present embodiment with an adhesive.

For this reason, for example, as shown in FIG. 6, if an uncoated location is formed at the region A between the first rib 13a and the second rib 13b, it is possible to repair water leakage by recoating a repair-use adhesive along the entrance to the clearance between panels from the visible part 132 of the first rib 13a to the visible part 132 of the second rib 13b. That is, according to the present embodiment, the visible parts 132 able to be seen of adjoining ribs 13 form the start point and end point of the range of repair, so the range of repair becomes clear and water leakage can be repaired easily.

Figure 7:
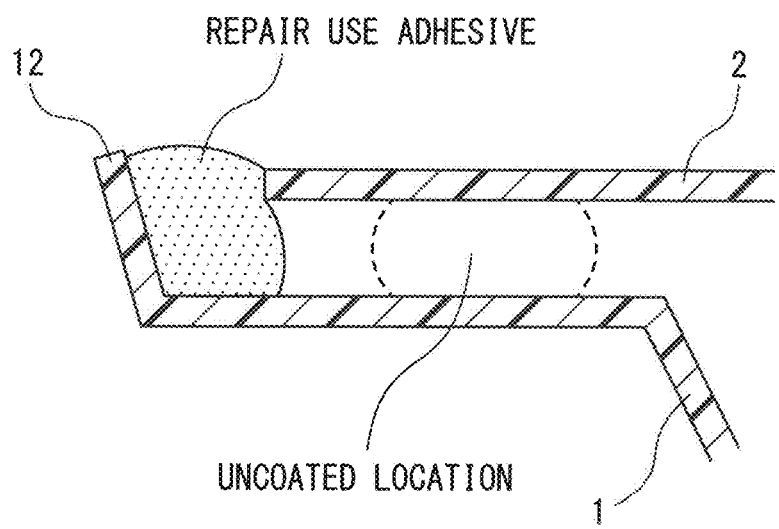
FIG. 7 is a cross-sectional view of a vehicular-use door according to the present embodiment along the line VII-VII of FIG. 6 in the state recoating a repair-use adhesive at an entrance to a clearance between panels from a first rib to a second rib after bonding the outer panel.
Figure 8:
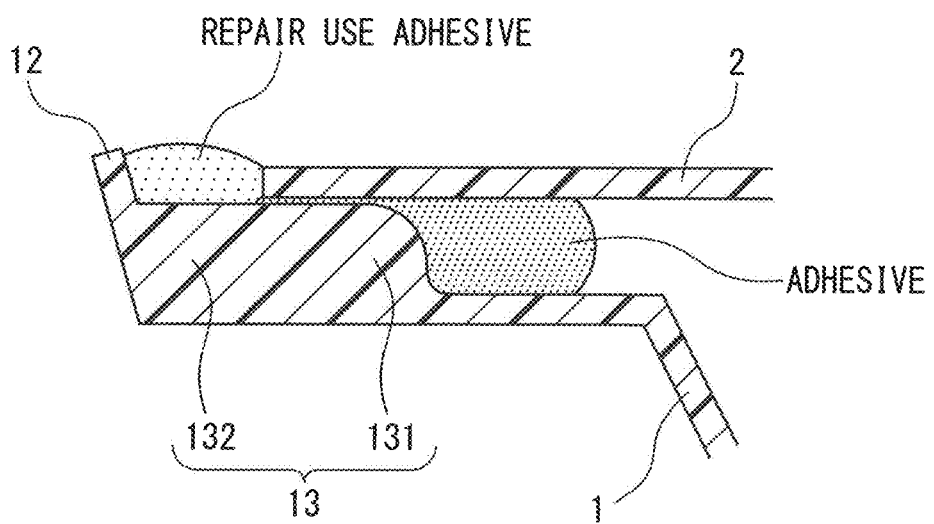
FIG. 8 is a cross-sectional view of a vehicular-use door according to the present embodiment along the line VIII-VIII of FIG. 6 in the state recoating a repair-use adhesive at an entrance to a clearance between panels from a first rib to a second rib after bonding the outer panel.

FIG. 7 is a cross-sectional view of a vehicular-use door 100 according to the present embodiment along the line VII-VII of FIG. 6 in the state recoating a repair-use adhesive at an entrance to a clearance between panels from the first rib 13a to the second rib 13b after bonding the outer panel 2. FIG. 8 is a cross-sectional view of the vehicular-use door 100 according to the present embodiment along the line VIII-VIII of FIG. 6 in the state when recoating a repair-use adhesive at the entrance to the clearance between panels from the first rib 13 to the second rib 13 after bonding the outer panel 2.

As shown in FIG. 7 and FIG. 8, the non-visible parts 131 of the ribs 13 are bonded with the outer panel 2, so water entering into a certain region of the clearance between panels divided by the ribs 13 can be prevented from entering a region adjoining that region by the ribs 13. For this reason, it is possible to easily repair water leakage by recoating a repair-use adhesion along the entrance to the clearance between panels from the visible part 132 of one rib 13 between adjoining ribs 13 defining the region in which water leakage is confirmed to the visible part 132 of the other rib 13.

Further, in the present embodiment, the flange 12 is formed so as to extend along the outer edge of the peripheral edge part 11 substantially in parallel to the coating direction of the adhesive, so the flange 12 can be used to keep the repair-use and other adhesive from flowing to the outer edge side of the peripheral edge part 11 and to define the width of coating of the adhesive (length in direction perpendicular to coating direction).

Figure 9:
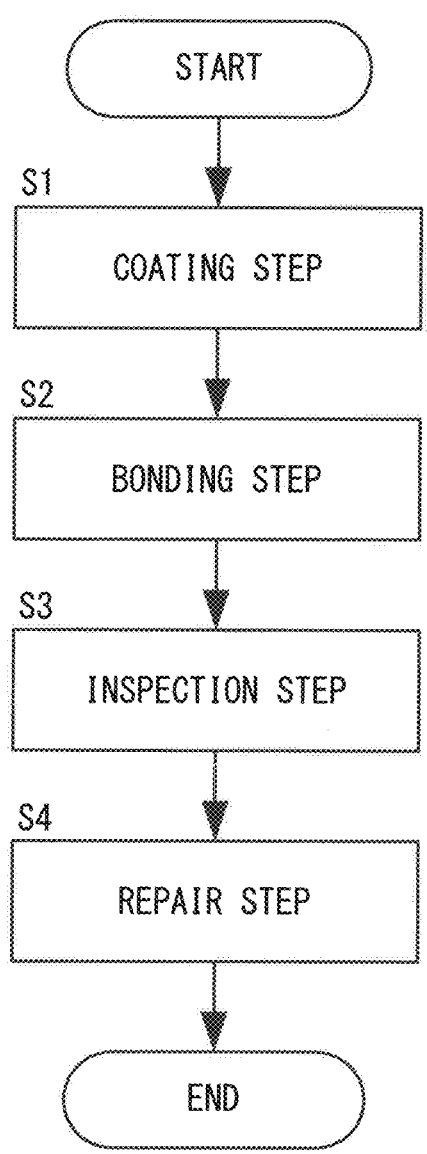
FIG. 9 is a flow chart for explaining a method of production of a vehicular-use door according to the present embodiment.

Next, the method of production of the vehicular-use door 100 according to the present embodiment will be explained. FIG. 9 is a flow chart for explaining the method of production of the vehicular-use door 100 according to the present embodiment.

At a coating step of step S1, the peripheral edge part 11 is coated with an adhesive so as to cross parts of the ribs 13 formed at the peripheral edge part 11 of the window-use opening 3 of the inner panel 1 (non-visible parts 131). Alternatively, the adhesive is coated at the facing surface of the outer panel 2 forming the part facing the peripheral edge part 11 at which the ribs 13 are formed.

At the bonding step of step S2, when the peripheral edge part 11 of the inner panel 1 is coated with the adhesive at step S1, the peripheral edge part 11 is bonded with the outer panel 2 so that the parts of the ribs 13 not crossing the adhesive (visible parts 132) can be seen from the outside. On the other hand, when the facing surface of the outer panel 2 is coated with the adhesive at step S1, the outer panel 2 is bonded with the peripheral edge part 11 so that the adhesive crosses the ribs 13 and parts of the ribs 13 (visible parts 132) can be viewed from the outside.

At the inspection step of step S3, any water leakage from the clearance between the inner panel 1 and the outer panel 2 divided by the ribs 13 into a plurality of regions along the coating direction of the adhesive is inspected for. If water leakage is confirmed, the routine proceeds to step S4.

At the repair step of step S4, the region where water leakage is confirmed in the plurality of regions of the clearance between panels divided by the ribs 13 is repaired. Specifically, water leakage is repaired by recoating a repair-use adhesive along the entrance to the clearance between panels from the visible part 132 of the one rib 13 of adjoining ribs 13 defining the region where water leakage is confirmed to the visible part 132 of the other rib 13.

The above explained vehicular-use door 100 according to the present embodiment is provided with an inner panel 1 (first panel) and an outer panel 2 (second panel) bonded to the peripheral edge part 11 of the inner panel 1 (panel bonding part).

The inner panel 1 is configured provided with a plurality of ribs 13 sticking out from the peripheral edge part 11 along the coating direction of the adhesive so as to cross the adhesive coated on the inner panel 1 or the outer panel 2.

For this reason, it is possible to divide the clearance between panels formed between the inner panel 1 and the outer panel 2 after bonding the outer panel 2 into a plurality of regions along the coating direction of the adhesive by the ribs 13. Due to this, it is possible to judge any water leakage for each of the plurality of regions divided by the ribs 13.

Further, each rib 13 is provided with a non-visible part 131 which is bonded to the outer panel 2 and which is covered by the outer panel 2 and can no longer be viewed from the outside and a visible part 132 which extends from the non-visible part 131 in a direction crossing the adhesive and which is not covered by the outer panel 2 and can be viewed from the outside.

For this reason, if water leakage occurs, it is possible to repair the water leakage by recoating a repair-use adhesive along the entrance to the clearance between panels from the visible part 132 of one rib 13 of the adjoining ribs 13 defining the region where water leakage has occurred to the visible part 132 of the other rib 13. That is, if water leakage occurs, the visible parts 132 able to be seen of adjoining ribs 13 defining the region where the water leakage has been confirmed can be made the start point and end point of the range of repair, so the range of repair can be clarified.

Further, by clarifying the range of repair, the repair worker can easily repair water leakage, so the number of steps of repair work can be reduced. Further, by clarifying the range of repair, the amount of use of the repair adhesive in the case where water leakage occurs can be kept to the minimum necessary extent, so the costs can be cut.

Further, the inner panel 1 (first panel) of the vehicular-use door 100 according to the present embodiment is configured further provided with a wall shaped flange 12 sticking out from the peripheral edge part 11 (panel bonding part) so as to extend in parallel with the coating direction of the adhesive. Further, the ribs 13 are configured so that the edge parts at the visible part 132 sides abut against the flange 12.

Due to this, when recoating the span between visible parts 132 able to be seen of adjoining ribs 13 by a repair-use adhesive along the entrance to the clearance between panels, the flange 12 can be used to keep the repair-use and other adhesive from flowing to the outer edge side of the peripheral edge part and to define the coated width of the adhesive (length in direction perpendicular to coating direction). For this reason, it is possible to clarify more the range of repair.

Further, according to the present embodiment, the visible parts 132 of the ribs 13 are formed more to the outer edge side of the peripheral edge part 11 than the non-visible parts 131. That is, the visible parts 132 of the ribs 13 are formed at the outer edge side of the vehicular-use door 100, so in the repair work, the visible parts 132 of the ribs 13 can be easily seen and repair can be easily performed and the work efficiency of repair work can be improved.

Further, the method of production of the vehicular-use door 100 according to the present embodiment comprises a coating step of coating a peripheral edge part 11 (panel bonding part) of an inner panel 1 (first panel) with an adhesive so as to cross a plurality of ribs 13 formed at the peripheral edge part 11 or coating an adhesive on a facing surface of an outer panel 2 (second panel) facing the peripheral edge part 11 of the inner panel 1 on which the plurality of ribs 13 are formed, a bonding step of bonding the outer panel 2 to the peripheral edge part 11 so that parts of the ribs 13 not crossing the adhesive can be viewed from the outside after the coating step when coating the peripheral edge part 11 with the adhesive in the coating step and of bonding the outer panel 2 to the peripheral edge part 11 so that the adhesive crosses the ribs 13 and so that parts of the ribs 13 not crossing the adhesive can be viewed from the outside after the coating step when coating foe facing surface of the outer panel 2 with the adhesive in the coating step, an inspection step of inspecting for any water leakage from the clearance between the inner panel 1 and the outer panel 2 divided by the ribs 13 into a plurality of regions along the coating direction of the adhesive after the bonding step, and a repair step of repairing a region where water leakage is confirmed in the plurality of regions divided by the ribs 13 when water leakage is confirmed by the inspection step. Specifically, the repair step is a step of coating a repair-use adhesive along the entrance of a clearance between the inner panel 1 and the outer panel 2 from parts of one rib 13 not crossing the adhesive between two ribs 13 defining the region where the water leakage is confirmed to the part of the other rib 13 not crossing the adhesive.

By producing a vehicular-use door 100 through such steps, it is possible to judge any water leakage for each of the plurality of regions divided by the ribs 13 along the coating direction. Further, if water leakage occurs, just the region where the water leakage occurs need be repaired, so it is possible to clarify the range of repair of water leakage and easily repair water leakage.

Above, an embodiment of the present disclosure was explained, but the embodiment only shows part of the examples of application of the present disclosure and is not meant to limit the technical scope of the present disclosure to the specific constitution of the embodiment.

Figure 10:
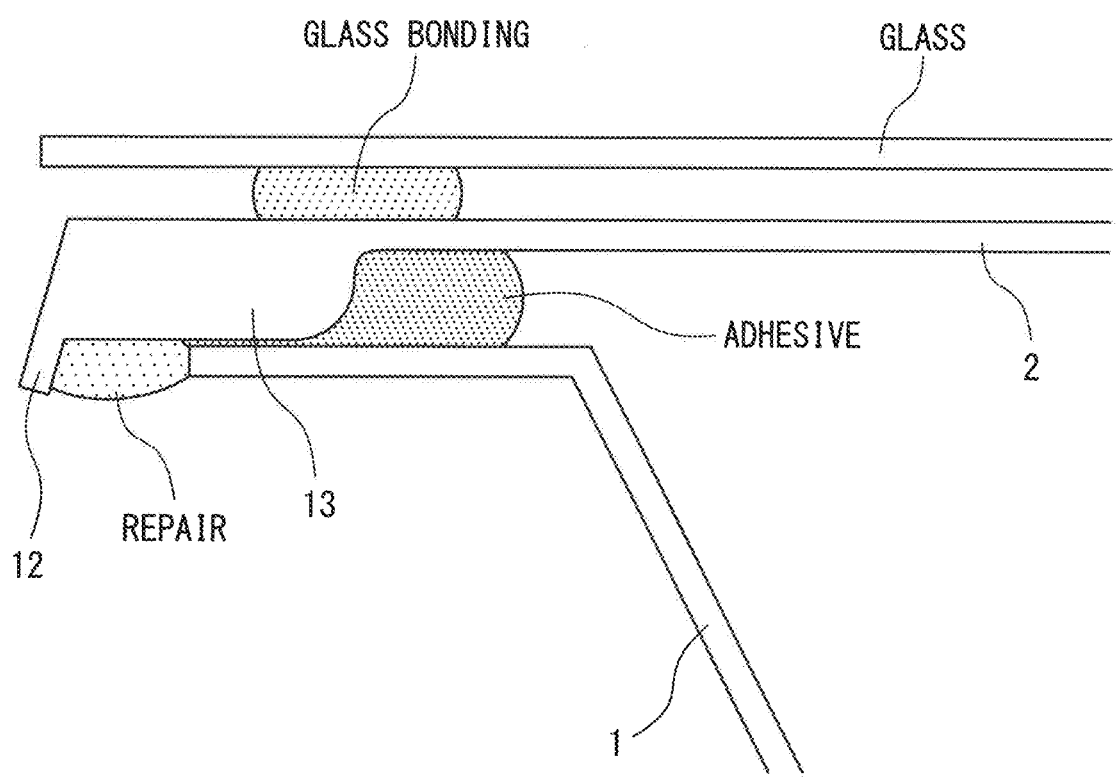
FIG. 10 is a view showing simplified a peripheral edge part of an inner panel of a vehicular-use door according to a modification of one embodiment of the present disclosure.

For example, in the above embodiments, the inner panel 1 was formed with the flange 12 and ribs 13. However, like in the vehicular-use door 100 according to the modification of the present embodiment shown in FIG. 10, it is also possible to form the flange 12 and ribs 13 at the outer panel 2 and bond the outer panel 2 to the inner panel 1. By doing this as well, it is possible to obtain an effect similar to the present embodiment. Note that, in this case, in the claims, the first panel is the outer panel 2 and the second panel is the inner panel 1.

The invention claimed is:

1. A vehicular-use door comprising:
a first panel; and
a second panel bonded to a panel bonding part of the first panel,
in which vehicular-use door,
the first panel is provided with a plurality of ribs, sticking out from the panel bonding part so as to cross an adhesive coated on the first panel or the second panel, along the coating direction of the adhesive, and
each rib is provided with:
a non-visible part which is bonded to the second panel and which is covered by the second panel and can no longer be viewed from the outside; and
a visible part which extends from the non-visible part in a direction crossing the adhesive and which is not covered by the second panel and can be viewed from the outside.

2. The vehicular-use door according to claim 1, wherein
the first panel is provided with a wall-shaped flange sticking out from the panel bonding part so as to extend in parallel to the coating direction of the adhesive, and
an end part of each rib at the visible part side abuts against the flange.

3. The vehicular-use door according to claim 1, wherein
the first panel is an inner panel arranged at an inside of a vehicle compartment,
the second panel is an outer panel arranged at an outside of a vehicle compartment,
the panel bonding part is a peripheral edge part of a window-use opening formed at the inner panel, and
the visible part of the rib is formed more at the outer edge side of the peripheral edge part than the non-visible part.

* * * * *